United States Patent [19]

Fujino et al.

[11] Patent Number: 5,659,817
[45] Date of Patent: Aug. 19, 1997

[54] MODE SELECTING SYSTEM OF A CAMERA

[75] Inventors: Akihiko Fujino; Shinichi Nishimura, both of Sakai; Sadanobu Ueda, Osaka; Noriyuki Ishii, Sakai, all of Japan

[73] Assignee: Minolta Co., Ltd., Osaka, Japan

[21] Appl. No.: 324,786

[22] Filed: Oct. 18, 1994

[30] Foreign Application Priority Data

Oct. 19, 1993 [JP] Japan .................................. 5-261299

[51] Int. Cl.⁶ ............................. G03B 3/00; G03B 17/18
[52] U.S. Cl. ............................................ 396/137; 396/291
[58] Field of Search ............................. 354/474, 475, 354/289.12, 289.11, 266; 396/103, 137, 281, 291

[56] References Cited

U.S. PATENT DOCUMENTS

| | | | |
|---|---|---|---|
| 3,893,133 | 7/1975 | Tsujimoto et al. | 354/24 |
| 4,616,916 | 10/1986 | Someya et al. | 354/442 |
| 5,264,889 | 11/1993 | Ishida et al. | 354/402 |
| 5,283,606 | 2/1994 | Konno et al. | 354/289.1 |
| 5,298,936 | 3/1994 | Akitake et al. | 354/471 |

OTHER PUBLICATIONS

Nikon, model N50, US market date Feb. 28, 1994.
"Syasin Kogyo" Magazine (Photographic Industry) vol. 51, No. 3, pp. 58–75 (Mar., 1993).

*Primary Examiner*—Safet Metjahic
*Assistant Examiner*—Eric Nelson
*Attorney, Agent, or Firm*—Sidley & Austin

[57] ABSTRACT

A mode selecting system of a camera which comprises a first mode group which includes a plurality of photo-taking modes, wherein photographing parameters are automatically set by the camera when each one among the modes of the first mode group is selected, and a second mode group which includes a plurality of photo-taking modes, wherein at least one of photographing parameters is manually settable when one among the modes of the second mode group is selected. The system further comprises an operation member which is operated to changeover a mode group between the first mode group and the second mode group, a mode select initiation member which is operated to set the camera into a condition where the photo-taking modes can be changed, a selector which is operated to select one mode in the first mode group and the second mode group, and a display which indicates all of modes contained in the group which is selected by the operation member when the mode select initiation member is operated and indicates one mode which is selected by the selector when the selector is operated.

15 Claims, 7 Drawing Sheets

MODE SELECTING SYSTEM OF A CAMERA

BACKGROUND OF THE INVENTION

1. Field of the Invention

The present invention relates to a mode selecting system of a camera having a plurality of modes.

2. Description of the Prior Art

In recent years, cameras have acquired an increasing number of functions, and in addition to the conventional general photo-taking modes comprising exposure modes such as shutter speed priority mode, aperture priority mode, manual mode and program mode, special photo-taking modes that have respective different program lines according to the scene based on the purpose of the photograph, such as portrait mode, sightseeing mode (souvenir picture mode), close-up mode, sports mode, night view mode, etc., have also been provided. Japanese Laid-Open Patent Publication No. Hei 3-202819 discloses a camera in which both these conventional general photo-taking modes and special photo-taking modes are selected by one rotatable dial. The dial is so constructed that all of the modes are directed by a rotational angle within one rotation of the dial, and the conventional general photo-taking modes and the special photo-taking modes are separated by a hard click stop therebetween. A camera user may select them by rotating the dial to certain designated positions.

However, with said construction, the more exposure modes there are to be selected, when the user switches from a particular exposure mode to another exposure mode, it becomes necessary for the user to rotate the setting member an increasingly greater amount. In this case, because the mode cannot be changed instantly, a good photo-taking opportunity may be lost, or a photograph may be taken in a mode not suitable to the situation. A scene desired to be photographed may be taken in a previously set exposure mode, resulting in a unsuccessful photograph which does not have the intended effect.

In order to eliminate these problems, the object of the present invention is to provide a camera that is easy to understand and use by allowing the user to switch immediately to a desired exposure mode from a previously set exposure mode.

SUMMARY OF THE INVENTION

In order to achieve said object, the present invention comprises a first mode group which includes a plurality of photo-taking modes, wherein photographing parameters are automatically set by the camera when each one among the modes is selected; a second mode group which includes a plurality of photo-taking modes, wherein at least one of photographing parameters is manually settable when one among the modes of the second mode group is selected; an operation member which is operated to changeover a mode group from said first mode group to said second mode group, and vice versa; a mode select initiation member which is operated to set the camera into a condition where the photo-taking modes can be changed; a selector which is operated to select one mode in said first and said second mode groups; and a display which indicates all of modes contained in the group which is selected by said operation member when said mode select initiation member is operated and indicates one mode which is selected by said selector when said selector is operated.

Further, the present invention comprises a first mode group which includes a plurality of photo-taking modes, wherein photographing parameters are automatically set by the camera when each one among the modes is selected; a second mode group which includes a plurality of photo-taking modes, wherein at least one of photographing parameters is manually settable when one among the modes of the second mode group is selected; an operation member which is operated to changeover from said first mode group to said second mode group, and vice versa; and a selector which is operated to select one mode in said first and said second mode groups; wherein one mode in said first mode group is contained in said second mode group, in common.

Further, the present invention is characterized by a first mode group which includes a plurality of photo-taking modes, wherein photographing parameters are automatically set by the camera when each one among the modes is selected; a second mode group which includes a plurality of photo-taking modes, wherein at least one of photographing parameters is manually settable when one among the modes of the second mode group is selected; a first operation member which is operated to changeover from said first mode group to said second mode group, and vice versa; a selector which is operated to select one mode in said first and said second mode groups; a second operation member which is manually operable and a controller activated by the operation of said second operation member so as to reset the camera condition to a specified mode of the modes contained in the current mode group.

Still further, the present invention is characterized by a first mode group which includes a plurality of photo-taking modes; a second mode group which includes a plurality of photo-taking modes, wherein at least one of the modes is different from the modes contained in said first mode group; a first operation member which is operated to changeover from said first mode group to said second mode group, and vice versa; a second operation member which is manually operable and a controller activated by the operation of said second operation member so as to reset the camera condition to a specified mode of the modes contained in the current mode group; and wherein, said second operation member is a button to be manually depressed and said first operation member is a member to be rotated around said second operation member.

Still more, the present invention is characterized by a first mode group which includes a plurality of photo-taking modes, wherein photographing parameters are automatically set by the camera when each one among the modes is selected; a second mode group which includes a plurality of photo-taking modes, wherein at least one of photographing parameters is manually settable when one among the modes of the second mode group is selected; an operation member which is operated to changeover a mode group from said first mode group to said second mode group, and vice versa; a mode select initiation member which is operated to set the camera into a condition where the photo-taking modes can be changed; a selector which is operated to select one mode in said first and said second mode groups, wherein the mode is cyclically selected each time said selector is operated; a first memory which stores the latest mode in said first mode group which is selected by said selector; a second memory which stores the latest mode in said second mode group which is selected by said selector; and a controller which controls the condition of the camera so that the stored mode in one of said first memory and said second memory is resumed in response to the operation of said mode select initiation member.

With each of the above constructions, a camera may be provided in which the user may switch immediately from a present exposure mode to a desired exposure mode easily.

BRIEF DESCRIPTION OF THE DRAWINGS

These and other objects and features of the invention will become more apparent from the following description, taken in conjunction with the preferred embodiment with reference to the accompanied drawings in which.

DETAILED DESCRIPTION OF THE PREFERRED EMBODIMENT

An embodiment of the present invention is described below.

Figure 1:
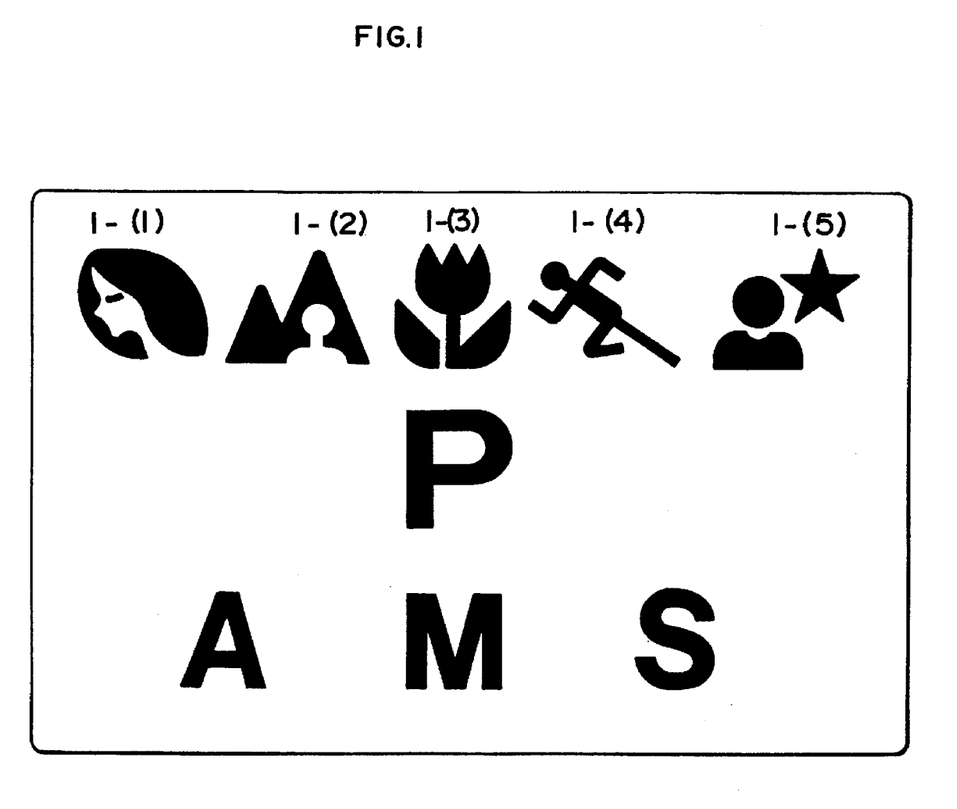
FIG. 1 shows the exposure mode display of an embodiment of the present invention.

FIG. 1 is a drawing showing all exposure modes of the embodiment. Pictograph 1-(1) shows a portrait mode, and is a mode in which the aperture is set to open in order to perform focusing on only the main photographing object such as a person and vignetting on the background. Pictograph 1-(2) shows a sightseeing mode in which the aperture is stopped-down to bring in focus both the main photographing object such as persons, etc., and the background. Pictograph 1-(3) shows a close-up mode in which the aperture is stopped-down to allow exposure appropriate to close-range photo-taking. Pictograph 1-(4) shows a sports mode, which is a mode in which the aperture is set to open to increase the shutter speed to allow proper photo-taking of a fast-moving photographing object. Pictograph 1-(5) shows a night view mode, which is a mode that slows the shutter speed to allow photo-taking of a nighttime background. The combination of the shutter speed and the aperture value is automatically set by the camera in the above exposure modes. That is, each of the above modes is a kind of program mode.

The letter P indicates P-mode (standard type program mode), which is a mode that automatically controls the camera to have a standard shutter speed and aperture value in response to the brightness of the photographing object. The letter A indicates aperture priority mode (hereinafter called 'A-mode'), the letter S indicates shutter speed priority mode (hereinafter called "S-mode'), and the letter M indicates manual mode (hereinafter called "M-mode'). At least one of the shutter speed and the aperture value is manually settable in the above A mode, S mode and M mode.

Figure 2:
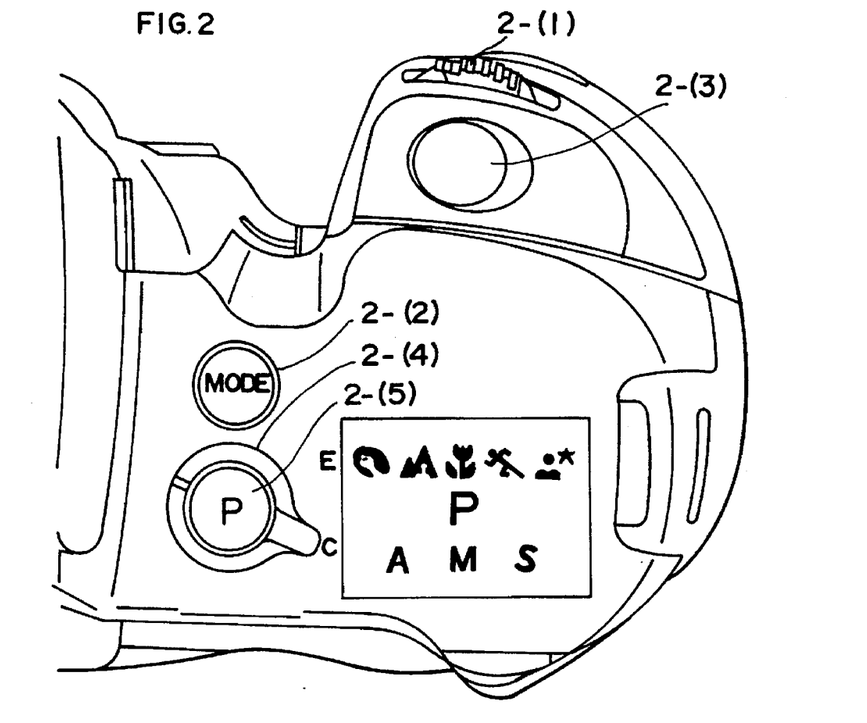
FIG. 2 shows an external view of a portion of the camera of the embodiment.

FIG. 2 is an external view of a portion of the camera of the present embodiment. In the drawing, 2-(1) is a dial switch (hereinafter 'dial SW') and in this embodiment it may change the exposure mode when operated together with mode switch (hereinafter 'mode SW') 2-(2). 2-(3) is a release switch (hereinafter 'release SW') that begins light measurement and focus detection (or distance measurement), and that may also perform exposure. 2-(4) is an E/C lever that switches between special photo-taking mode position and general photo-taking mode position. When the lever is set at position E, it indicates that special photo-taking mode group (hereinafter called "E-mode group') is chosen, while when it is set at position C, it indicates that general photo-taking mode group (hereinafter called "C-mode group') is chosen. 2-(5) is a P-switch (hereinafter 'PSW'), and is a program reset switch that always switches the photo-taking mode to P-mode when operated, whether the E/C lever is set at position E or position C. Because this switch is operable whether the photo-taking mode is of the E-mode group or the C-mode group, it is located inside the E/C lever in an easy-to-understand fashion.

Figure 3:
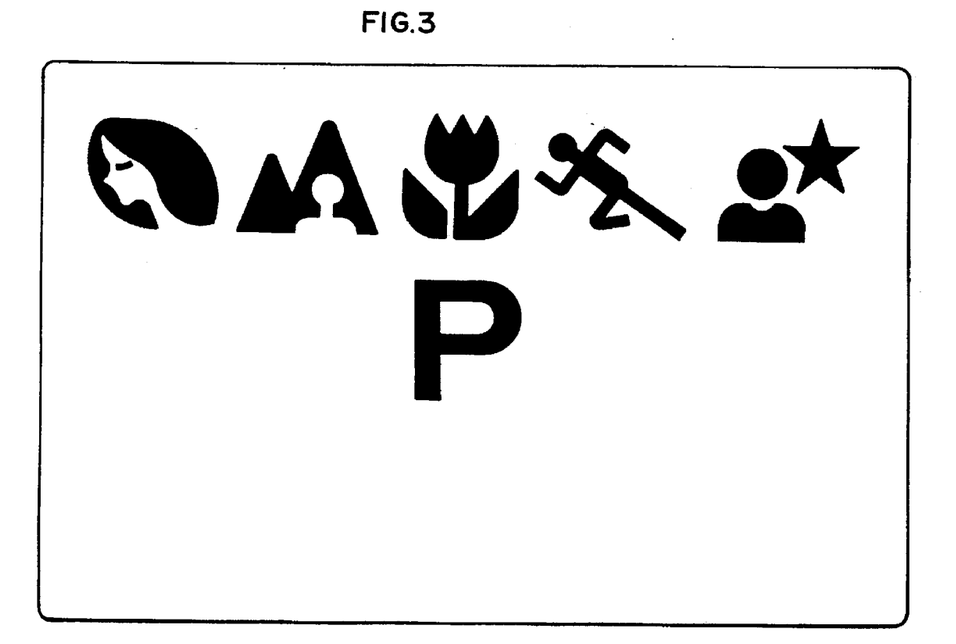
FIG. 3 shows all exposure mode displays in special photo-taking modes.

FIG. 3 is a display of E-mode group exposure modes and is present when the E/C lever is switched from the setting at C-mode group to E-mode group. When a prescribed period of time elapses, the mode returns to the exposure mode active when the camera was last in E-mode group. In other words, for example, if the mode is set to portrait mode in E-mode group and the E/C lever is then switched to C-mode group and then switched back to E-mode group, and neither the mode SW nor the dial SW is subsequently operated within a prescribed period of time, the mode returns to the previous setting, i.e., portrait mode.

Figure 4:
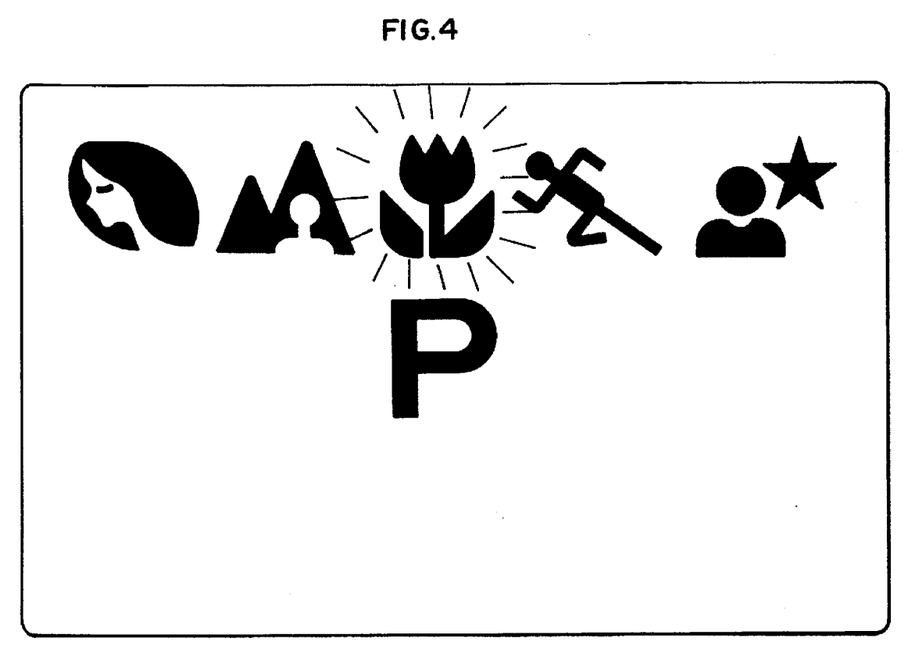
FIG. 4 shows the display during a change of exposure mode among the special photo-taking modes.
Figure 5:
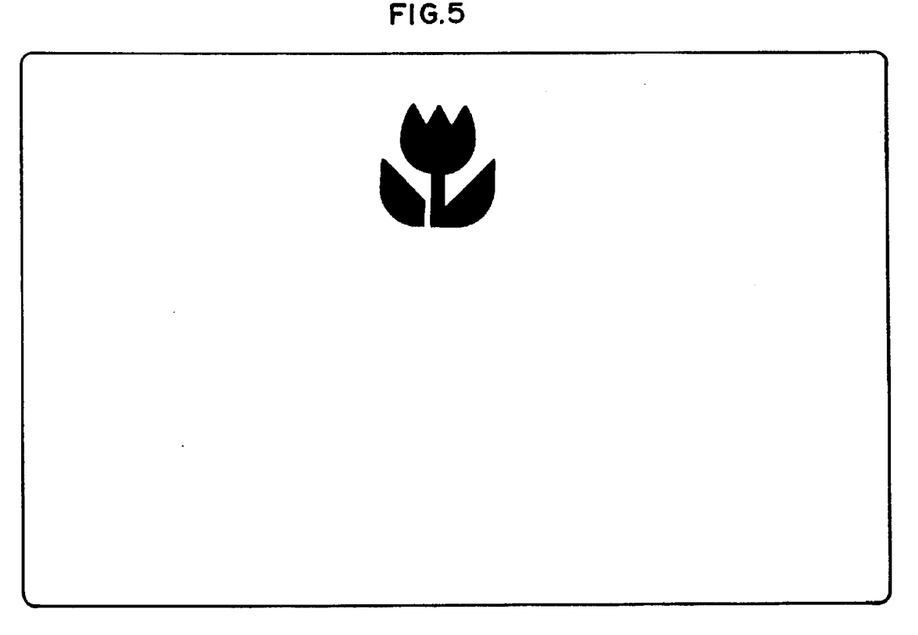
FIG. 5 shows the display when close-up mode is selected as the exposure mode.

FIG. 4 is a display showing a change of exposure mode within E-mode group, in which the mode SW is operated from the situation shown in FIG. 3, and only the selected exposure mode flashes. Here, when the dial SW is rotated, the flashing display alternates in sequence according to the direction of said rotation. Then if, for example, close-up mode is selected and the operation of the mode SW is terminated, the display shown in FIG. 5 is obtained.

Where photo-taking is performed in a certain mode and it is then desired to photograph a different photographing object—for example, where a close-range photograph has been taken of a flower in close-up mode, and the photo-taker then wishes to take a photograph that includes both the flower and a person and takes the photograph with the exposure mode remaining in close-up mode—while either the flower or the person will be in focus, the other will not, and the photographing will not turn out as desired. However, in this situation, by operating the PSW, the exposure mode may be immediately switched to P-mode and the camera will perform photo-taking with the parameters most suited to the photographing object, such that the photo-taker need not miss the photo-taking opportunity and the correct photograph may be taken with both the flower and the person in focus. Moreover, where it is desired to make the photograph more interesting, sightseeing mode may be selected by means of the mode SW and the dial SW.

Figure 6:
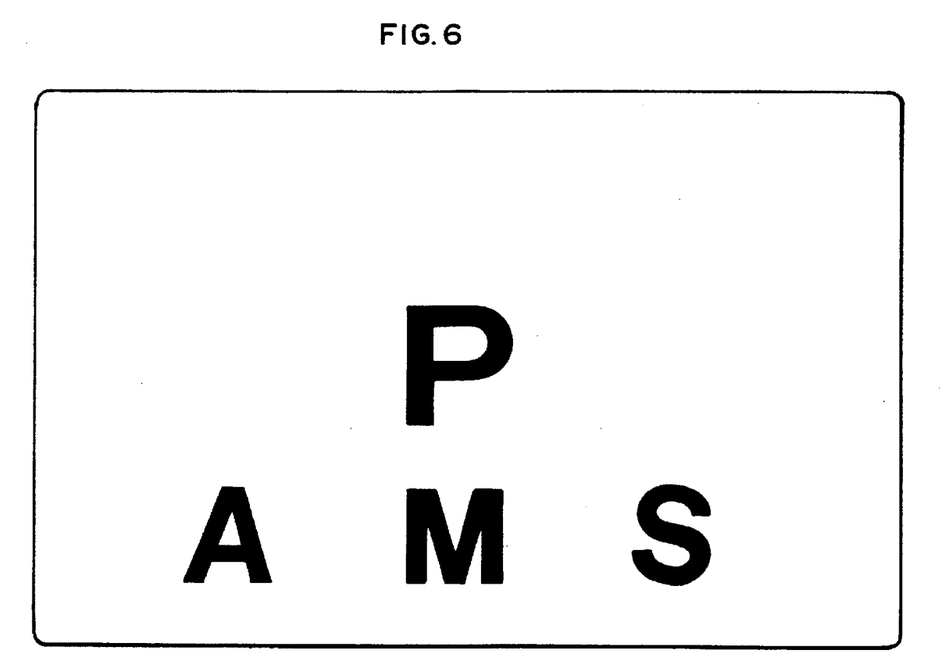
FIG. 6 shows all exposure mode displays in general photo-taking modes.

FIG. 6 shows the display of the exposure modes in C-mode group and is obtained when the E/C lever is switched from E-mode group to C-mode group. After the passage of a prescribed period of time, the camera returns to the previously active mode in C-mode group, in the same way as explained above in regard to E-mode group.

Figure 7:
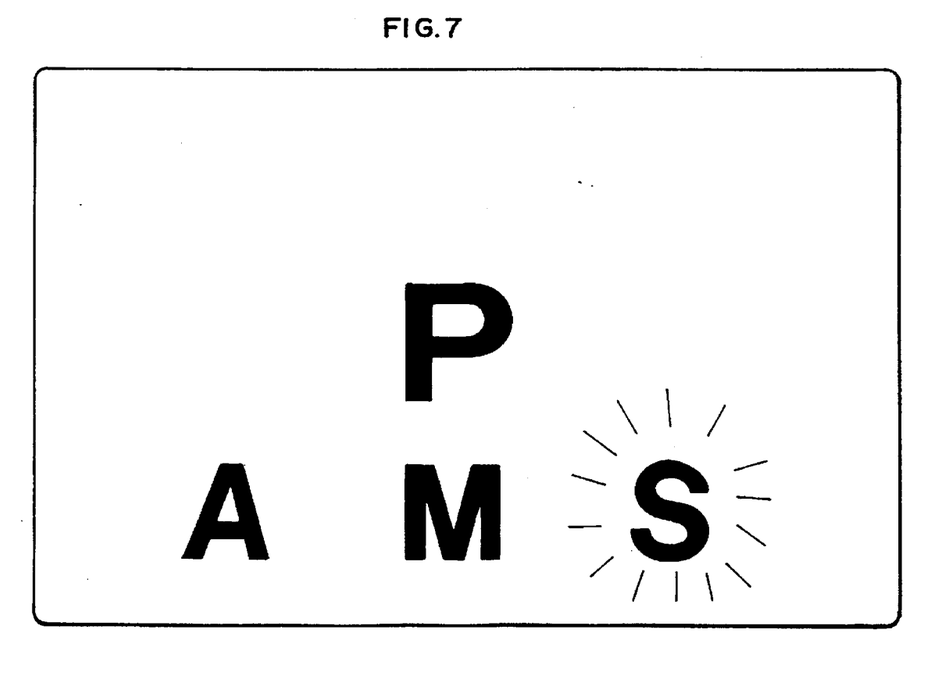
FIG. 7 shows the display during a change of exposure mode in the general photo-taking mode.

FIG. 7 shows the display when the exposure mode is changed in C-mode group, and shows the display when the mode SW is operated and the selected S-mode flashes. The exposure mode is changed by rotating the dial SW in the same way as with E-mode group.

Figure 8:
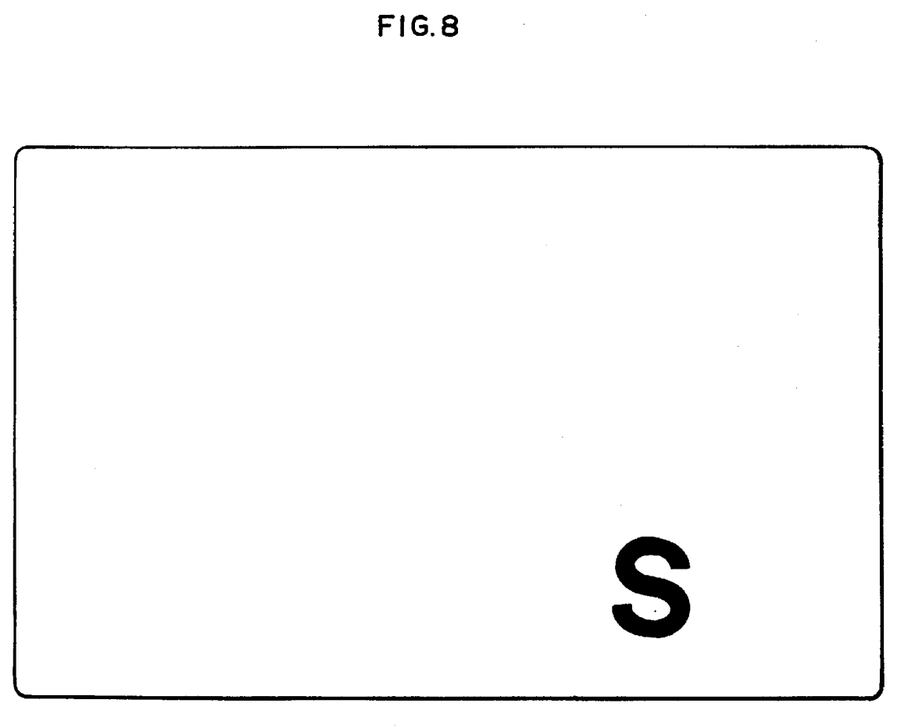
FIG. 8 shows the display when shutter speed priority mode is selected as the exposure mode.

FIG. 8 shows the display when S-mode is selected, and the mode changes to P-mode when the PSW is operated in the same way as with E-mode group.

In addition to the above embodiment in which the exposure mode is switched to P-mode merely by operating the PSW, many other modifications in which drive mode (from continuous exposure mode to single-frame exposure mode), exposure correction (from correction present to correction not present), and/or electronic flash mode (from forced emission to automatic emission) may be selected are also possible.

Figure 9:
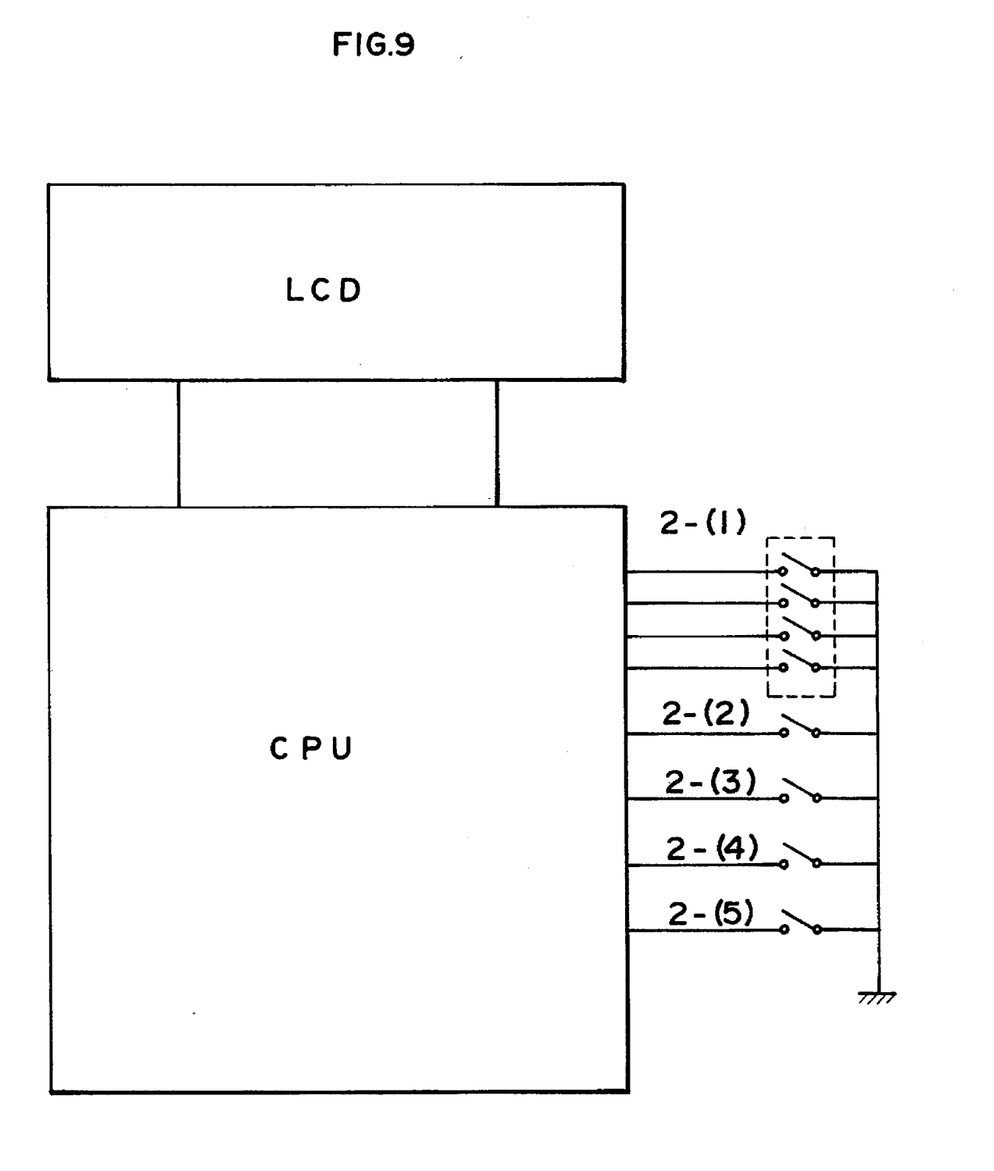
FIG. 9 shows a circuit block diagram of the embodiment.

FIG. 9 is a block diagram of the circuit used in the present invention. 2-(1) through 2-(5) in FIG. 9 correspond to the same numberings in FIG. 2. CPU performs processing according to the flow chart outlined in FIG. 10 based on the status of 2-(1) through 2-(5), and is displayed by LCD (Liquid Crystal Display). Dial SW 2-(1) comprises four bits, and its rotational direction and amount is determined by the CPU. In addition, when the switch is ON, E/C lever 2-(4) is in C-mode group, and when it is OFF, E/C lever 2-(4) is in E-mode group.

Figure 10:
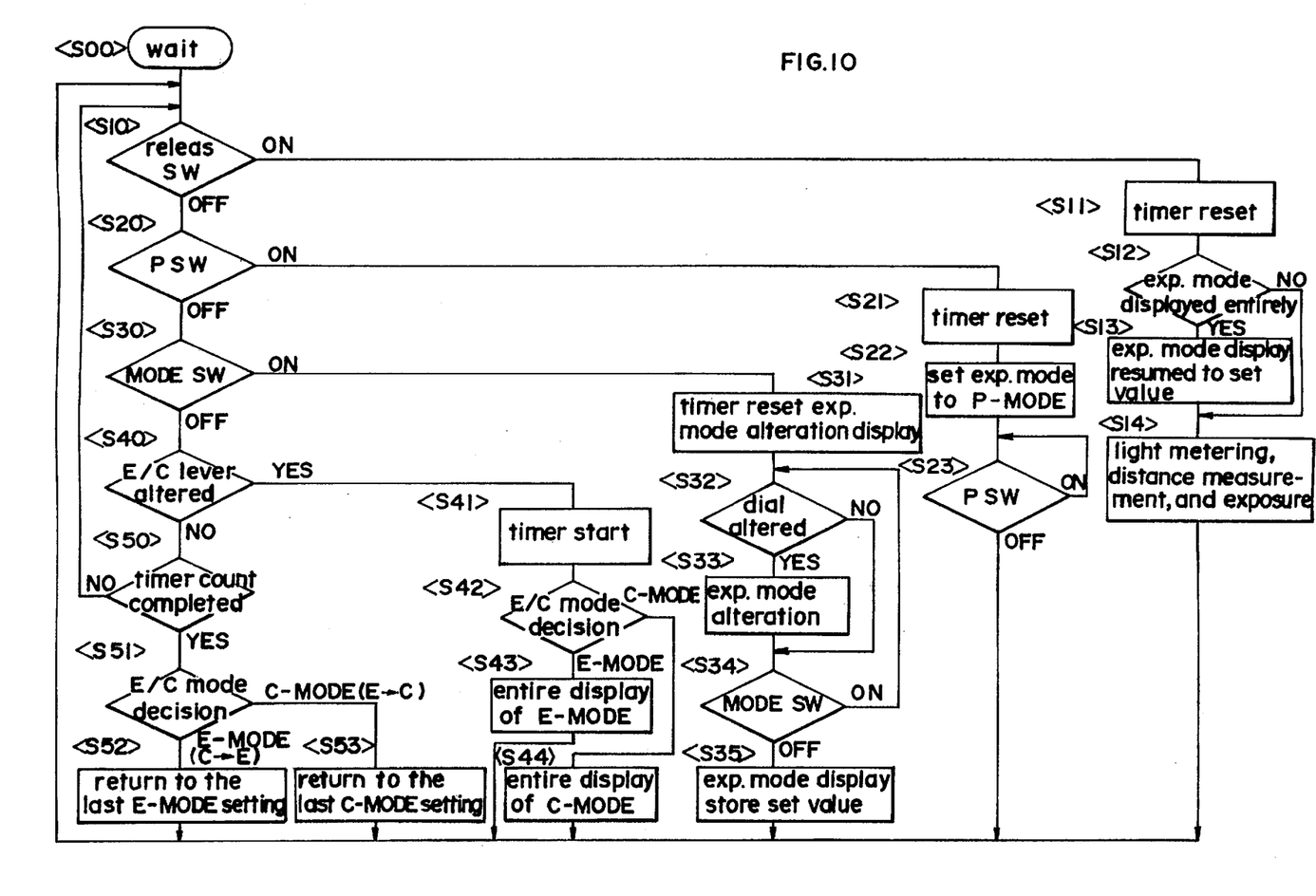
FIG. 10 shows an outline flow chart of the embodiment.

Next, the flow chart in FIG. 10 is explained in detail.

First, the camera is in the WAIT condition in step S00, and if the camera is not operated, the camera is maintained in that condition until it is operated. In step S10 it is determined whether the release SW has been depressed, and if it is ON, the routine skips to step S11. Here, the timer count (described below) is reset, and in step S12 it is checked whether all exposure modes are displayed. If all exposure modes are displayed in E-mode group or C-mode group, the previous setting is restored in step S13, and after completion of light measurement, focus detection (or distance measurement) and exposure control, the routine returns to step S00. If no is returned in step 12, light measurement, focus detection (distance measurement) and exposure control are performed in that state.

In step S20 the status of the PEW is determined, and if it is ON, the routine advances to step S21 and the timer is reset. Then, in step S22 the exposure mode is returned to P-mode and in step S23 it is confirmed whether the PSW has been released, and the routine then returns to the WAIT condition.

In step S30, it is determined whether the mode SW is ON or OFF, and if it is ON, the routine advances to step S31, where the timer is reset and the exposure mode change is displayed. Where E-mode group is present, one of the exposure modes within E-mode group is caused to flash as shown in FIG. 4, and where C-mode group is present, one of the exposure modes within C-mode group is caused to flash as shown in FIG. 7. The exposure mode is then changed in response to the operation of the dial SW, and this process is repeated while the mode SW is being depressed. When the mode SW is released, the exposure mode set at that time is displayed and the selected setting is stored in memory.

In S40 it is determined whether the E/C lever has been operated, and if it has been operated, timer counting is commenced in S41. It is then determined whether the photo-taking mode is of the E-mode group or the C-mode group, and if it is of the E-mode group, all of the exposure modes that may be selected in E-mode group are displayed as shown in FIG. 3, and if it is of the C-mode group, all of the exposure modes that may be selected in C-mode group are displayed as shown in FIG. 6.

When the timer count commenced in step S41 together with the switching of the E/C lever completes counting without the exposure mode being changed, the routine advances to step S51 and the photo-taking mode is determined. If the photo-taking mode is of the E-mode group, it is determined that the switching of the E/C lever in S40 was from the C-mode group to the E-mode group, and in step S52 the exposure mode last selected and stored in memory when the camera was previously in E-mode group is restored and displayed, the other exposure mode displays are extinguished, and the routine returns to step S00. Similarly, if the photo-taking mode is of the C-mode group, it is determined that the switching of the E/C lever in S40 was from the E-mode group to the C-mode group, and in step S53 the exposure mode last selected and stored in memory when the camera was previously in C-mode group is restored and displayed, the other exposure mode displays are extinguished, and the routine returns to step S00.

In addition, in a different embodiment, where the photo-taking mode is changed by means of the E/C lever, the original photo-taking mode is then returned to and there is no operation to change the exposure mode within a prescribed period of time, the exposure mode setting may be set to P-mode.

Although the present invention has been fully described in connection with the preferred embodiment thereof with reference to the accompanying drawings, it is to be noted that various changes and modifications are apparent to those skill in the art. Such changes and modifications are to be understood as included within the scope of the present invention as defined by the appended claims unless they depart therefrom.

What is claimed is:

1. A mode selecting system of a camera, comprising:
   a first mode group which includes a plurality of photo-taking modes, wherein photographing parameters are automatically set by the camera when each respective one among the modes of the first mode group is selected;
   a second mode group which includes a plurality of photo-taking modes, wherein at least one of photographing parameters is manually settable when one among the modes of the second mode group is selected;
   an operation member which is operated to changeover a mode group from said first mode group to said second mode group, and vice versa;
   a mode select initiation member which is operated to set the camera into a condition where the photo-taking modes can be changed;
   a selector which is operated to select one mode in said first and said second mode groups; and
   a display which indicates all of the modes contained in the group which is selected by said operation member when said mode select initiation member is operated and indicates one mode which is selected by said selector when said selector is operated.

2. The mode selecting system of claim 1, wherein said display indicates the modes of said first mode group by means of pictographs and indicates the modes of said second mode group by means of characters.

3. The mode selecting system of claim 1, wherein one mode in said first mode group is contained in said second mode group, in common.

4. The mode selecting system of claim 1, further comprising:
   a manually operable member; and
   a controller which controls the camera to set a predetermined photo-taking mode when said manually operable member is operated irrespective of the selected group.

5. The mode selecting system of claim 1, wherein the mode is cyclically selected each time said selector is operated, and further comprises:

a first memory which stores the latest mode in said first mode group which is selected by said selector;

a second memory which stores the latest mode in said second mode group which is selected by said selector; and a controller which controls the condition of the camera so that the stored mode in one of said first memory and said second memory is resumed in response to the operation of said mode select initiation member.

6. A mode selecting system of a camera, comprising: a first mode group which includes a plurality of photo-taking modes, wherein photographing parameters are automatically set by the camera when each respective one among the modes of said first mode group is selected;

a second mode group which includes a plurality of photo-taking modes, wherein at least one of photographing parameters is manually settable when one among the modes of said second mode group is selected;

an operation member which is operated to changeover from said first mode group to said second mode group, and vice versa; and a selector which is operated to select one mode in said first and said second mode groups;

wherein one mode in said first mode group is contained in said second mode group, in common.

7. A mode selecting system of a camera, comprising:

a first mode group which includes a plurality of photo-taking modes, wherein photographing parameters are automatically set by the camera when each respective one among the modes of said first mode group is selected;

a second mode group which includes a plurality of photo-taking modes, wherein at least one of photographing parameters is manually settable when one among the modes of said second mode group is selected;

a first operation member which is operated to changeover from said first mode group to said second mode group, and vice versa;

a selector which is operated to select one mode in said first mode group and said second mode group;

a second operation member; and a controller activated by the operation of said second operation member so as to reset the camera to a specified mode of the modes contained in the current mode group.

8. The mode selecting system of claim 7, wherein one mode in said first mode group is contained in said second mode group, in common, and said specified mode is said common mode.

9. The mode selecting system of claim 7, wherein said second operation member is a button to be depressed and said first operation member is a member to be rotated around said second operation member.

10. A mode selecting system of a camera, comprising:

a first mode group which includes a plurality of photo-taking modes;

a second mode group which includes a plurality of photo-taking modes, wherein at least one of the modes of said second mode group is different from the modes contained in said first mode group;

a first operation member which is operated to change over from said first mode group to said second mode group, and vice versa;

a second operation member; and a controller activated by the operation of said second operation member so as to reset the camera to a specified mode of the modes contained in the current mode group;

and wherein, said second operation member is a button to be depressed and said first operation member is a member to be rotated around said second operation member.

11. A mode selecting system of a camera, comprising:

a first mode group which includes a plurality of photo-taking modes, wherein photographing parameters are automatically set by the camera when each respective one among the modes of said first mode group is selected;

a second mode group which includes a plurality of photo-taking modes, wherein at least one of photographing parameters is manually settable when one among the modes of said second mode group is selected;

an operation member which is operated to changeover a mode group from said first mode group to said second mode group, and vice versa;

a mode select initiation member which is operated to set the camera into a condition where the photo-taking modes can be changed;

a selector which is operated to select one mode in said first and said second mode groups, wherein the mode is cyclically selected each time said selector is operated;

a first memory which stores the latest mode in said first mode group which is selected by said selector;

a second memory which stores the latest mode in said second mode group which is selected by said selector; and a controller which controls the condition of the camera so that the stored mode in one of said first memory and said second memory is resumed in response to the operation of said mode select initiation member.

12. A mode selecting system of a camera, comprising:

a first mode group including a plurality of photo-taking modes, wherein the combination of a shutter speed and an aperture value is automatically set by the camera when each respective one among the modes of said first mode group is selected;

a second mode group which includes a plurality of photo-taking modes, wherein at least one of the shutter speed and the aperture value is manually settable when one among the modes of said second mode group is selected;

an operation member which is operated to change over a mode group from the first mode group to the second mode group, and vice versa;

a selector which is operated to select one mode in said first mode group and said second mode group; and a display which indicates all of the modes contained in the mode group which is selected by said operation member before said selector is operated and indicates only one mode which is selected by said selector after said selector is operated.

13. The mode selecting system of claim 12, wherein said display indicates the modes of said first mode group by means of pictographs and indicates the modes of said second mode group by means of characters.

14. The mode selecting system of claim 12, further comprising:

a manually operable member; and a controller which controls the camera to set a predetermined photo-taking mode when said manually operable member is operated irrespective of the selected group.

15. The mode selecting system of claim 12, wherein one mode in said first mode group is contained in said second mode group, in common.

* * * * *